United States Patent Office 3,421,084
Patented Jan. 7, 1969

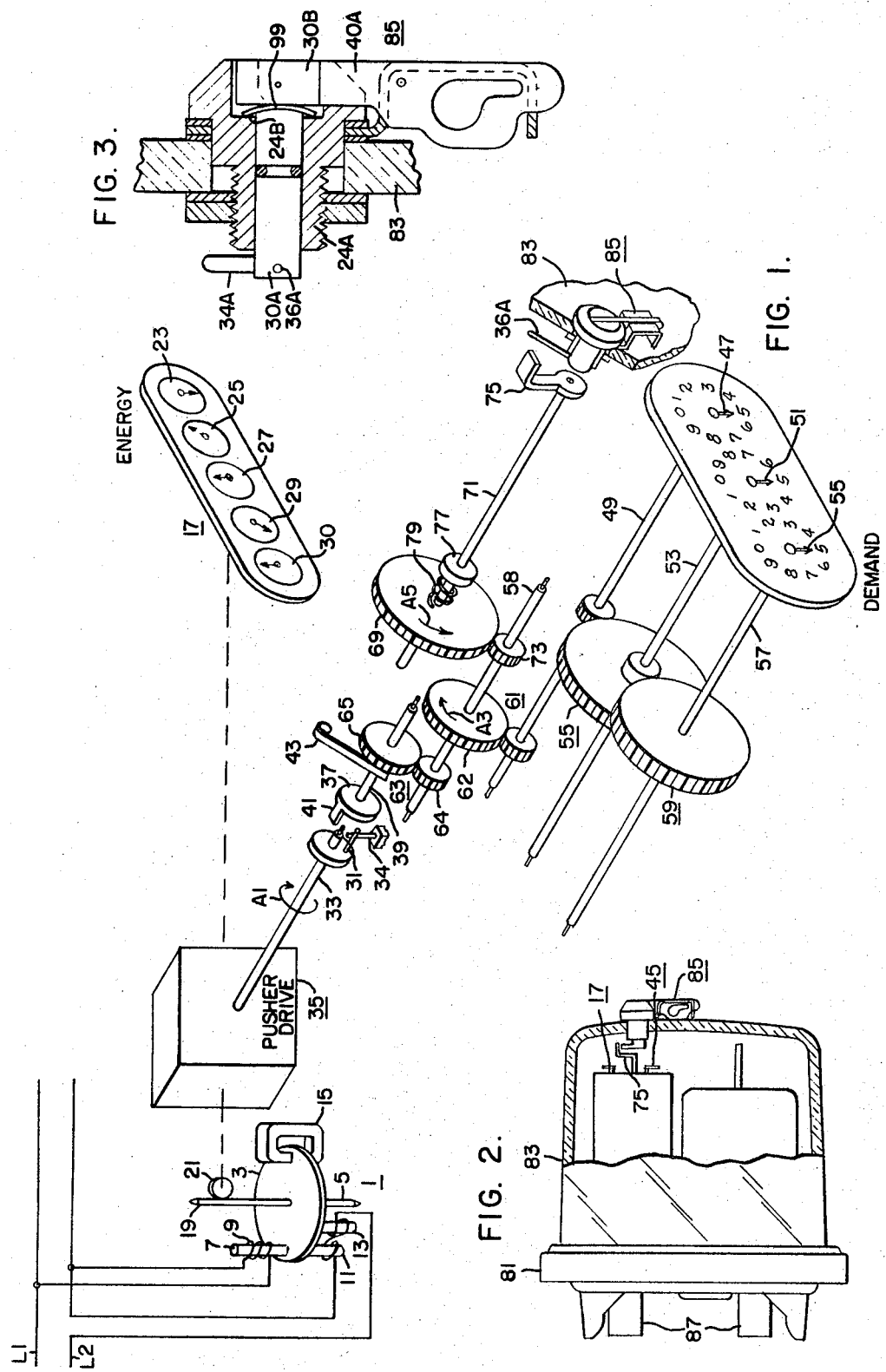

3,421,084
DECADE DIAL TYPE MAXIMUM DEMAND METER
Eugene C. Benbow and Earl L. Burnette, Raleigh, N.C., assignors to Westinghouse Electric Corporation, Pittsburgh, Pa., a corporation of Pennsylvania
Filed Oct. 5, 1964, Ser. No. 401,559
U.S. Cl. 324—103    8 Claims
Int. Cl. G01r 19/16

ABSTRACT OF THE DISCLOSURE

The small arcuate movement of a demand meter pusher element is geared up to present large arcuate movement to a decade dial. Resetting is provided by means of a spring linked gear driving the gearing up mechanism and the decade dial backwards.

---

This invention relates to register devices and it has particular relation to devices for measuring the maximum demand of a variable quantity.

Although the invention may be incorporated in a device for measuring various variable quantities it is particularly suitable for measuring the maximum demand of electric energy. For this reason in the following discussion it will be assumed that the invention is incorporated in a device for measuring the maximum demand of electric energy.

For measuring the total consumption of electric energy it has been the practice to employ several orders of decimal digit or decade counters. However, to indicate the maximum demand of electric energy it has been customary to employ a single sweep hand which is rotated about an axis through an angle substantially less than 360°.

Efforts have been made in the past to indicate the maximum demand by means of plural-order decimal digit or decade counters similar to those employed for indicating the total consumption of electric energy. One example of such construction will be found in the Lewis et al. Patent 2,259,314, issued Oct. 14, 1941. In the Lewis et al. version, the maximum demand occurring during a billing period is added to a reading previously stored in plural-order decade counters. Consequently, the difference between a reading of the counters and the next preceding reading of the counters represents the maximum demand occurring during the last complete billing period.

Efforts also have been made to indicate on plural-order decade counters the maximum demand for a billing period during which the reading is taken. However, difficulty has been experienced in providing satisfactory resetting mechanism for such counters.

In accordance with the invention plural-order decimal digit or decade counters are permanently coupled to a movable member which at any instant represents the maximum demand of the current billing period up to the instant. Also such counters are permanently coupled to a movable resetting member. The coupling is selected to permit resetting of the counters to predetermined positions in response to rotation of the resetting member through an angle which does not exceed 360°. Preferably, the coupling to the resetting member is effected through a yieldable or resilient link which minimizes the possibility of injury to the components.

It is therefore an object of the invention to provide an improved register device suitable for measuring the peak value of a variable quantity.

It is also an object of the invention to provide an improved plural-order decimal digit or decade counter device which can be reset without injury to the components.

Other objects of the invention will be apparent from the following description taken in conjunction with the accompanying drawing in which:

FIG. 1 is a schematic view with parts in perspective showing a measuring device embodying the invention;
FIG. 2 is a view in sectional elevation of the measuring device of FIG. 1; and
FIG. 3 is a view in sectional elevation with parts broken away of the reset mechanism employed in the device of FIG. 1.

In FIG. 1 it is assumed that the variable quantity to be measured is the electric energy supplied to a load over a circuit represented by conductors L1 and L2. Although a polyphase circuit may be employed, it will be assumed for present purposes that the circuit is a single-phase alternating current circuit operating at a power frequency such as 60 cycles per second.

The total electric energy supplied to the load is measured by a watt-hour meter 1 of conventional construction. For illustrative purposes the watt-hour meter includes an electroconductive armature disc 3 which is mounted on a shaft 5 for rotation about the axis of the shaft. A shifting magnetic field is created in a conventional manner to apply a torque to the disc 3. To this end a voltage pole 7 having a voltage coil 9 is connected for energization in accordance with the voltage across the conductors L1 and L2. Current poles 11 and 13 are provided with current windings which are connected for energization in accordance with current flowing in the conductor L2. A damping magnet 15 of the permanent-magnet type has an air gap within which a portion of the disc 3 is located in order to damp rotation of the disc in a manner well understood in the art.

The rotations of the disc 3 are counted by an energy register 17 which is coupled to a worm 19 provided on the shaft 5 through a worm wheel 21. It will be assumed that the register 17 includes a first-order decimal digit or decade counter 23, a second-order decade counter 25, a third-order decade counter 27, a fourth-order decade counter 29, and a fifth-order decade counter 30. Such counters are well understood in the art, and may be calibrated to read directly the total energy consumption in watt-hours of a load supplied through the conductors L1 and L2.

The meter 1 also rotates an operating member or pusher 31 and a shaft 33 about the axis of the shaft through a pusher drive 35. At the beginning of each demand interval the shaft 33 occupies a predetermined starting or zero position wherein the pusher 31 abuts a fixed zero stop pin 34 and is rotated in a clockwise direction in the direction of the arrow A1 as viewed in FIG. 1 away from such position in accordance with the energy consumption during the demand interval. For present purposes it will be assumed that the demand interval has a duration of 30 minutes. At the end of each demand interval the shaft 33 and the pusher 31 are reset to their zero positions in preparation for operation during a succeeding interval. Mechanism operating in this manner is well known in the art. For example, the shaft 33 may operate in the same manner as the sleeve 22 of the aforesaid Lewis et al. patent.

In order to determine the maximum rotation of the pusher 31 from its zero position over a billing period, a disc 37 is secured to a shaft 39 which is aligned with the shaft 33 but which is mounted for independent rotation about its axis. The disc 37 has a lug or pushed member 41 which projects into the path of rotation of the pusher 31. During its rotation the pusher 31 may engage the lug 41 to rotate the shaft 39 about its axis. When the pusher 31 is reset at the end of a demand interval, the shaft 39 is retained in its operated position by means of a spring leaf 43 which is biased into frictional engagement with the shaft 39 for the purpose of retaining the shaft in any position to which it is rotated. However, the frictional engagement between the spring leaf 43 and the shaft 39 does not prevent a resetting operation of the shaft 39 at the end of a billing period. During any demand interval if the pusher 31 is rotated through an angle greater than that occurring during any preceding demand interval of the billing period the pusher again engages the lug 41 for the purpose of advancing the lug 41 to a new position.

For indicating the position of the lug 41 the shaft 39 is permanently coupled to an indicating device in the form of a demand register 45. The specific demand register illustrated includes a first-order decimal digit or decade counter represented by a pointer 47 which is secured to a shaft 49 for rotation about the axis of the shaft. A second-order decade counter is represented by a pointer 51 which is secured to a shaft 53 for rotation about the axis of the shaft. A third-order decade counter is represented by a pointer 55 which is secured to a shaft 57 for rotation about the axis of the shaft. Gearing 55 rotates the shaft 53 once for each ten rotations of the shaft 49. Gearing 59 rotates the shaft 57 once for each ten rotations of the shaft 53.

The register 45 is permanently coupled to the shaft 39 through gearing 61 and gearing 63. The gear ratios may be so selected that the register 45 can be calibrated to read directly the maximum demand in watts occurring during any demand interval in a billing period.

The gearing 61 includes a pinion 60 mounted on the shaft 49 and a gear 62 secured to a shaft 58 for rotation about the axis of the shaft. The gearing 63 includes a pinion 64 secured to the shaft 58 and a gear 65 secured to the shaft 39.

Resetting of the demand register 45 to a predetermined or zero position is effected at the end of a billing period by rotation of the shaft 58 in a resetting direction (clockwise in the direction of the arrow A3 in FIG. 1). To this end a resetting member in the form of gear 69 is mounted on a shaft 71 for rotation about the axis of the shaft. The gear 69 is coupled to a pinion 73 secured to the shaft 58. Rotation of a reset arm 75 about the axis of the shaft 71 is employed for rotating the gear 69 about its axis. The resetting of the demand register 45 from its position of greatest advance is effected by rotation of the shaft 71 through an angle which does not exceed 360° in a counterclockwise direction in the direction of the arrow A5 in FIG. 1.

Although the gear 69 may be secured directly to the shaft 71 such a construction may result in damage to components of the gear train such as the pinions and gears. This is for the reason that the gearing is selected to effect many revolutions of the shaft 49 (in the case illustrated as many as 100 revolutions) for one revolution or less of the shaft 71. For such a gear relation a slight amount of friction offered to rotation by the shaft 49 is amplified to present a large torque opposing rotation of the shaft 71. Thus the torque applied to the shaft 71 for the purpose of overcoming the aforesaid friction may be sufficient to damage components of the gear train.

In order to prevent damage to components of the gear train, a yieldable or resilient coupling is introduced between the point of application of a resetting force and the demand register. In the specific embodiment of FIG. 1 the gear 69 is mounted for rotation relative to the shaft 71. The shaft has secured thereto a collar 77. A helical spring 79 surrounds the shaft 71, has one end secured to the gear 69 and has its remaining end secured to the collar 77. Thus the spring 79 represents a resilient coupling between the gear 69 and the reset arm 75 which permits relative movement of these parts through a suitable angle such as 15°.

In practice the components thus far described would be enclosed in the casing such as we have shown in FIG. 2. This casing may include a base member 81 on which the meter 1 is mounted. The registers 17 and 45 are also shown in FIG. 2 as supported through the meter 1 by the base member 81. A cup-shaped glass cover 83 has its open end closed by the base member 81 to complete an enclosure for the meter and registers. The registers may be read through the transparent glass cover.

It will be noted that the reset arm 75 is positioned adjacent the front wall of the member 83. This wall carries a reset unit 85 which may be operated at the end of the billing period by a meter reader for the purpose of resetting the demand register 45 through operation of the arm 75. Contact blades 87 project from the base member 81 for the purpose of establishing electrical connections between the meter 1 and an external circuit.

Although the reset unit 85 may be of conventional construction a suitable unit is illustrated in FIGURE 3. For illustrative purposes it will be assumed that the reset unit is generally similar to that shown in the Benbow et al. Patent 3,059,181, issued Oct. 16, 1962. Parts of the reset unit in FIG. 3 are labeled by the same reference characters employed in the Benbow et al. patent to identify the corresponding parts, except that in FIG. 3 the suffix A is added to each of such reference characters. For convenience the following list of parts of FIG. 3 is presented:

24A—Bushing
30A—Shaft
34A—Finger
36A—Stop pin
40A—Arm

It will be noted that a spring washer 99 is interposed between a shoulder 24B in the bore of the bushing 24A and the enlarged head 30B on the shaft 30A. This spring biases the shaft 30A to the right as viewed in FIG. 3 to develop a substantial friction between the shaft assembly and the bushing. This friction opposes movement of the shaft relative to the bushing with a torque which is slightly greater than that required to wind up the spring 79. Thus at the end of a resetting operation the friction prevents "zero bounce" of the register 45 by the wound spring 79 should the arm 40A suddenly be released. The spring 79 assures a resetting operation of the register 45, without unduly stressing any component of the structure.

A typical operation of the equipment shown in the drawing now will be considered. It will be assumed that a billing period has just been completed and that the demand register 45 has been reset to its zero condition. It will be assumed that the resetting operation has brought the lug 41 into engagement with the pusher 31. If electric energy is being supplied to a load during the succeeding demand interval of 30 minutes the watt-hour meter 1 operates to advance the energy register 17 in accordance with the energy supplied to the load, and the watt-hour meter also advances the pusher 31 about the axis of the shaft 33 in the direction of the arrow A1 at a rate dependent on the rate at which energy is being supplied to the load. During such movement the pusher 31 carries with it the lug 41 and this operates through its gear train to advance the pointers of the demand register 45 in accordance with the energy being supplied to the load.

At the expiration of the first demand interval following the resetting operation of the demand register the pusher 31 is reset to its zero condition in a manner which will be clear from the aforesaid Lewis et al. patent. However, the shaft 39 is maintained in its advanced position by the spring leaf 43.

During the next demand interval the consumption of energy by the load may be insufficient to bring the pusher 31 into engagement with the lug 41. In such case the condition of the demand register 45 remains unchanged. However if the load requirements increase sufficiently during a succeeding demand interval, the pusher 31 again engages the lug 41 and advances it still further. Such advance is accompanied by an increase in the reading of the demand register 45. In this way the demand register 45 at any instant of reading shows the maximum demand occurring for any demand interval of the current billing period up to the instant of reading.

At the end of the billing period which may be of one month duration, the meter reader notes the reading of the demand register 45 and of the energy register 17. He then manipulates the arm 40A counterclockwise to bring the finger 34A into engagement with the arm 75. Rotation of the 40A is accompanied by a winding operation of the helical spring 79. The helical spring in turn applies torque to the gear wheel 69 for the purpose of resetting the demand register 45 and the lug 41 until the lug again engages the pusher 31.

The stop pin 36A stops the resetting motion of the arm 40A when the arm has traveled far enough to assure resetting of the register 45. Should the meter reader suddenly release the arm 40A the friction developed by the spring washer 99 between the bushing 24A and the shaft 30A prevents rebound of the register by the spring 79 away from the reset position of the register. The meter reader then manipulates the arm 40A to rotate the shaft 30A in a clockwise direction until the arm reaches its sealing position. In such position the finger 34A is located beyond the maximum advance of the arm 75.

Although the invention has been described with reference to certain specific embodiments thereof numerous modifications falling within the spirit and scope of the invention are possible.

We claim as our invention:

1. In peak-indicating mechanism, an operating device including an operating member having an excursion from a base position which represents a value of a variable quantity, an operated member coupled to the operating member for movement to a position representing the maximum excursion of the operating member from the base position, and an indicator device for indicating the maximum excursion of the operating member, said indicator device comprising a first indicator member mounted for rotation about an axis, means permanently coupling the first indicator member to the operated member for operation through an angle in excess of 360°, a second indicator member, means coupling the second indicator member to the operated member for operation, the ratio of the operation of the first indicator member to the operation of the second indicating member by the operated member being other than unity, and resetting means operable for resetting said operated member and therefore the permanently coupled first and second indicator members to predetermined conditions at rates bearing said ratio relative to each other.

2. Mechanism as claimed in claim 1 wherein said resetting means comprises a rotatable member mounted for rotation about an axis and means responsive to rotation of said rotatable member about said axis through an angle not exceeding 360° for resetting said indicator members from any of their conditions to said predetermined conditions.

3. A mechanism as claimed in claim 1 wherein said resetting means comprises yieldable biasing means actuatable to develop a resetting force for the indicator device, and actuating means comprising an actuating member mounted for rotation about an axis, said actuating means in response to rotation of said actuating member about its axis through an angle not exceeding 360° being effective for actuating the biasing means to apply a resetting force sufficient to reset the indicator device to a predetermined condition but insufficient to damage the indicator device.

4. In peak-indicating mechanism, an operating device including an operating member having an excursion from a base position which represents a value of a variable quantity, an operated member coupled to the operating member for movement to a position representing the maximum excursion of the operating member from the base position, and an indicator device for indicating the maximum excursion of the operating member, said indicator device comprising a first indicator member mounted for rotation about an axis, means permanently coupling the first indicator member to the operated member for operation through an angle in excess of 360°, a second indicator member, means permanently coupling the second indicator member to the operated member for operation, the ratio of the operation of the first indicator member to the operation of the second indicating member by the operated member being other than unity, and resetting means operable for resetting said operated member and therefore the permanently coupled first and second indicator members to predetermined conditions at rates bearing said ratio relative to each other.

5. In a maximum demand device, a pusher member mounted for rotation through an angle which does not exceed 360° about an axis from a starting point in accordance with a variable quantity, said pusher member being reset to the starting point at repetitive times if at such times it is displaced from such point, a pushed member mounted for rotation about said axis and having a part in the path of said pusher, whereby said pusher in one direction of rotation pushes the pushed member to a position corresponding to the maximum excursion of said pusher from said starting point, a first order indicator mounted for rotation about an axis and permanently coupled to the pushed member for rotation through an angle in excess of 360° at a first rate rate relative to the pushed member within the range of movement of the pusher member, a second order indicator mounted for rotation about an axis and coupled to the pushed member for rotation at a second rate which differs from the first rate by a factor of ten, and a resetting member mounted for rotation about an axis and coupled to the indicators for resetting said indicators to predetermined positions in response to rotation of the resetting member about its axis.

6. A device as claimed in claim 5 in combination with an actuating member mounted for rotation about the axis of the resetting member, spring means coupling the actuating member to the resetting member, whereby rotation of the actuating member stores energy in the spring means while the resetting member follows the actuating member, and operating means movable from a position decoupled from the actuating member to a position coupled to the actuating member for rotating the actuating member to reset the indicators.

7. A device as claimed in claim 6 wherein the couplings are proportioned to provide a resetting operation of the indicators in response to a rotation of the actuating member about its axis which does not exceed 360°.

8. In a maximum demand device, a pusher member mounted for rotation about an axis from a starting point in accordance with a variable quantity, said pusher member being reset to the starting point at repetitive times if at such times it is displaced from such point, a pushed member mounted for rotation about said axis and having a part in the path of said pusher, whereby said pusher in one direction of rotation pushes the pushed member to a position corresponding to the maximum excursion of said pusher from said starting point, a first order indicator mounted for rotation about an axis and permanently coupled to the pushed member for rotation at a first rate relative to the pushed member, a second order indicator mounted for rotation about an axis and permanently coupled to the first order indicator through a coupling providing rotation of the second order indicator about its axis through an angle of 36° for each rotation of the first order indicator through an angle of 360°; an actuating member mounted for rotation about an axis, a resetting gear mounted for rotation relative to the actuating member about the last-named axis, gear means permanently coupling said resetting gear to the first order indicator for resetting the indicators in response to rotation of the resetting gear about its axis, and a spring having one end secured to the resetting gear and a second end secured to the actuating member for resiliently transmitting torques acting about the last-named axis between the actuating member and the resetting gear, said gear means and resetting gear being proportioned to reset the indicators to predetermined positions in response to a rotation of the actuating member about its axis which does not exceed 360°, and operating means movable from a position decoupled from the actuating member to a position coupled to the actuating member for rotating the actuating member to reset the indicators.

References Cited

UNITED STATES PATENTS 2,424,689   7/1947   Hamill _____ 324—103

RUDOLPH V. ROLINEC, Primary Examiner.

E. KARLSEN, Assistant Examiner.